(12) United States Patent
Jones, Jr.

(10) Patent No.: US 6,775,944 B1
(45) Date of Patent: Aug. 17, 2004

(54) METHOD FOR FISHING WITH WEEDLESS EASY-FALL BAIT

(75) Inventor: Nyles Kelley Jones, Jr., 1610 Cherokee, Deer Park, TX (US) 77536

(73) Assignee: Nyles Kelley Jones, Jr., Deer Park, TX (US)

( * ) Notice: Subject to any disclaimer, the term of this patent is extended or adjusted under 35 U.S.C. 154(b) by 0 days.

(21) Appl. No.: 10/235,307

(22) Filed: Sep. 5, 2002

(51) Int. Cl.$^7$ ............................................ A01K 85/00
(52) U.S. Cl. ...................... 43/4.5; 43/42.24; 43/42.26; 43/42.28
(58) Field of Search ................. 43/4.5, 42.24, 43/42.06, 42.31, 42.26, 42.28

(56) References Cited

U.S. PATENT DOCUMENTS

| | | | | |
|---|---|---|---|---|
| 885,861 A | * | 4/1908 | Pepper | 43/42.26 |
| 2,523,536 A | * | 9/1950 | Maddux | 43/42.03 |
| 2,775,839 A | * | 1/1957 | Kuslich | 43/42.03 |
| 3,162,971 A | * | 12/1964 | Gilliam | 43/42.3 |
| 3,585,749 A | * | 6/1971 | Dieckmann | 43/42.03 |
| 3,724,116 A | * | 4/1973 | Lindner et al. | 43/42.24 |
| D239,447 S | * | 4/1976 | Radcliff | 43/42.26 |
| 4,047,318 A | * | 9/1977 | Mapp | 43/42.24 |
| 4,167,076 A | * | 9/1979 | Weaver | 43/42.24 |
| 4,203,246 A | * | 5/1980 | Sacharnoski, Sr. | 43/42.31 |
| 4,312,148 A | * | 1/1982 | Hardwicke, III | 43/42.24 |
| 4,316,343 A | * | 2/1982 | Creme | 43/42.24 |
| 4,619,069 A | * | 10/1986 | Strickland | 43/42.26 |
| 4,771,564 A | * | 9/1988 | Whitley | 43/4 |
| 4,790,100 A | * | 12/1988 | Green, Sr. | 43/42.26 |
| 4,799,329 A | * | 1/1989 | Paulsen | 43/42.28 |
| 4,841,665 A | * | 6/1989 | McGahee | 43/42.24 |
| 4,912,871 A | * | 4/1990 | Brady | 43/42.26 |
| 4,920,686 A | * | 5/1990 | McGahee et al. | 43/42.24 |
| 4,953,319 A | * | 9/1990 | Kasper et al. | 43/42.24 |
| 5,167,088 A | * | 12/1992 | Wardall | 43/42.03 |
| 5,276,992 A | * | 1/1994 | Kato | 43/42.06 |
| 5,303,497 A | * | 4/1994 | Rabideau | 43/42.28 |
| 5,353,540 A | * | 10/1994 | Ward | 43/42.24 |
| 5,408,780 A | * | 4/1995 | Chambers, Sr. | 43/42.24 |
| 5,625,975 A | * | 5/1997 | Imes | 43/42.24 |
| 5,894,692 A | * | 4/1999 | Firmin | 43/42.24 |
| 5,934,008 A | * | 8/1999 | Rice | 43/42.26 |
| 5,946,847 A | * | 9/1999 | North | 43/42.31 |
| 6,041,540 A | * | 3/2000 | Potts | 43/42.24 |
| 6,113,895 A | * | 9/2000 | McCain | 43/42.06 |
| 6,173,523 B1 | * | 1/2001 | Johnson | 43/42.24 |
| D438,590 S | * | 3/2001 | Saverino | D22/127 |
| 6,266,916 B1 | * | 7/2001 | Dugan | 43/42.24 |
| 6,370,808 B1 | * | 4/2002 | D'Alessandro | 43/4.5 |
| 6,564,499 B1 | * | 5/2003 | Firmin | 43/42.26 |

* cited by examiner

*Primary Examiner*—Darren W. Ark
(74) *Attorney, Agent, or Firm*—Wendy Buskop; Buskop Law Group, P.C.

(57) ABSTRACT

The invention is a method of fishing by attaching a hook to a fishing line, attaching the hook to the flexible fishing lure, engaging the hook to a solid rod of the fishing lure, through an egg sack connected to the rod, wherein the egg sack forms an angle between 60 and 90 degrees, wherein the flexible fishing lure has two legs and wherein the rod, first and second legs have substantially identical conical shapes with substantially identical outer diameters, and wherein the egg sack has a cylindrical shape with an outer diameter 0.01 to 0.05 mm larger than the outer diameter of the rod and the two legs, then casting the lure through various types of cover, placing the lure in the strike zone causing reaction strikes from the fish without entangling the cover while maintaining a natural presentation to the bait, and bouncing the lure multi-directionally through the cover and creating vibration in the water without entangling the hook and the lure in the cover.

9 Claims, 5 Drawing Sheets

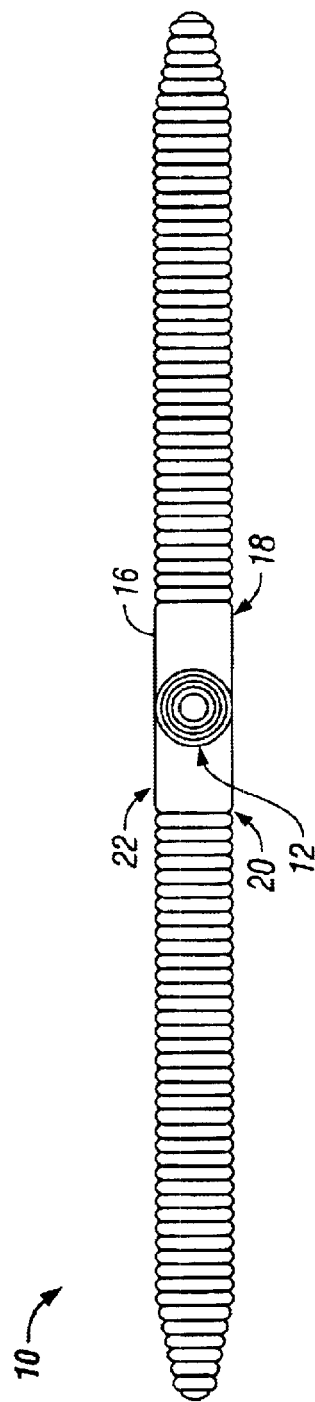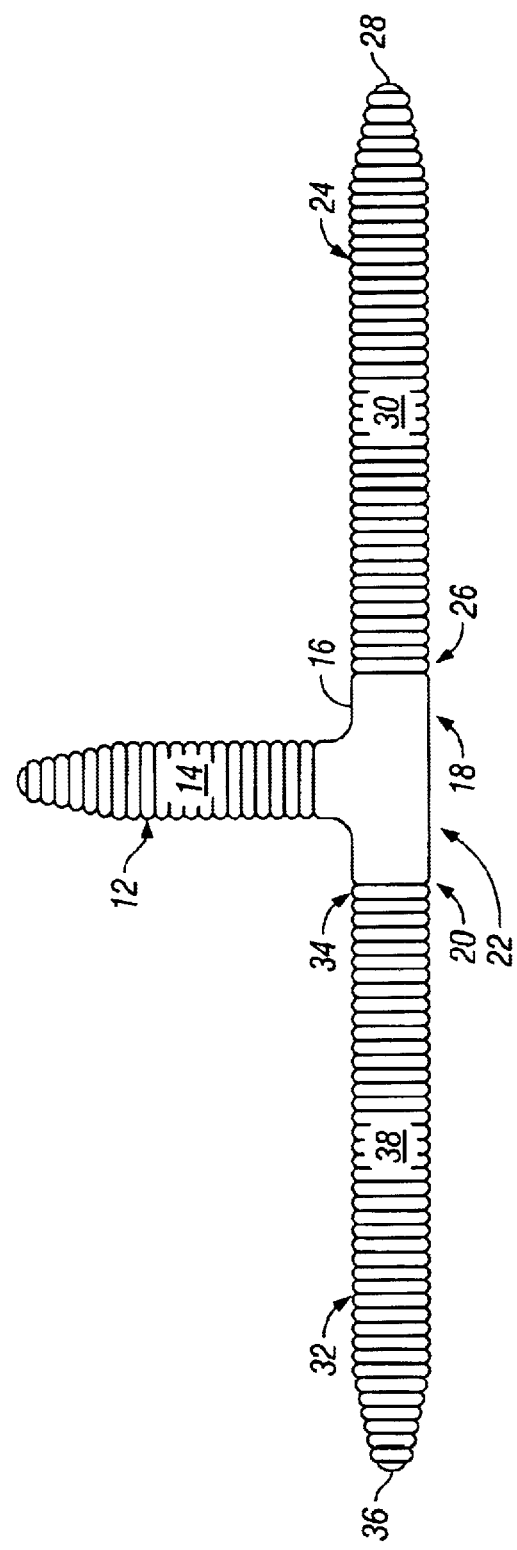

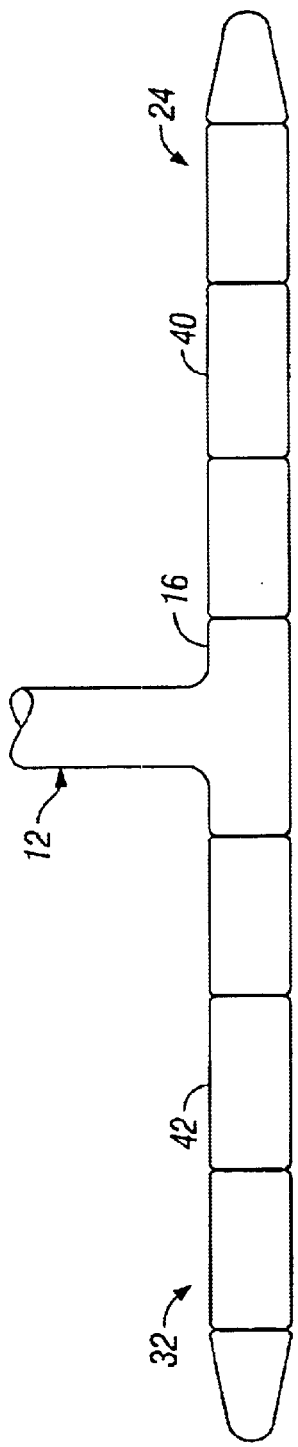
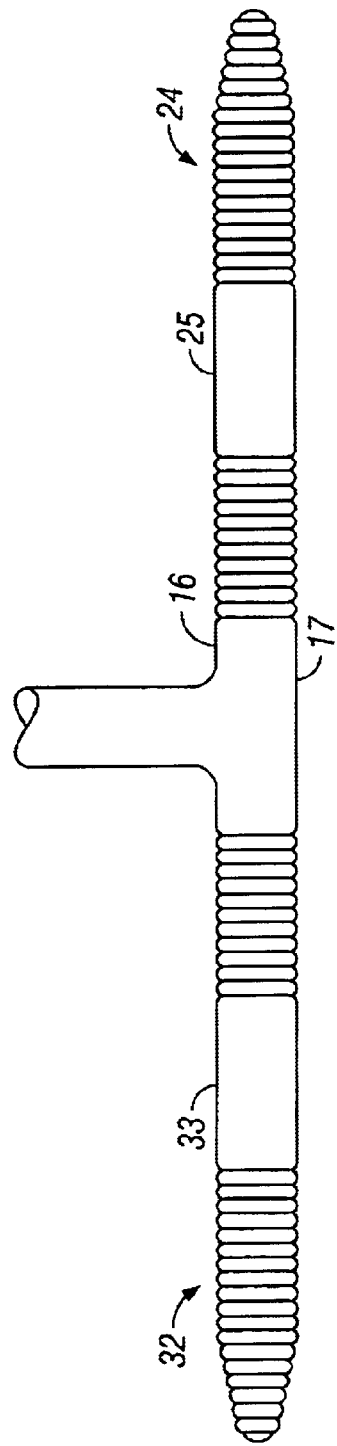

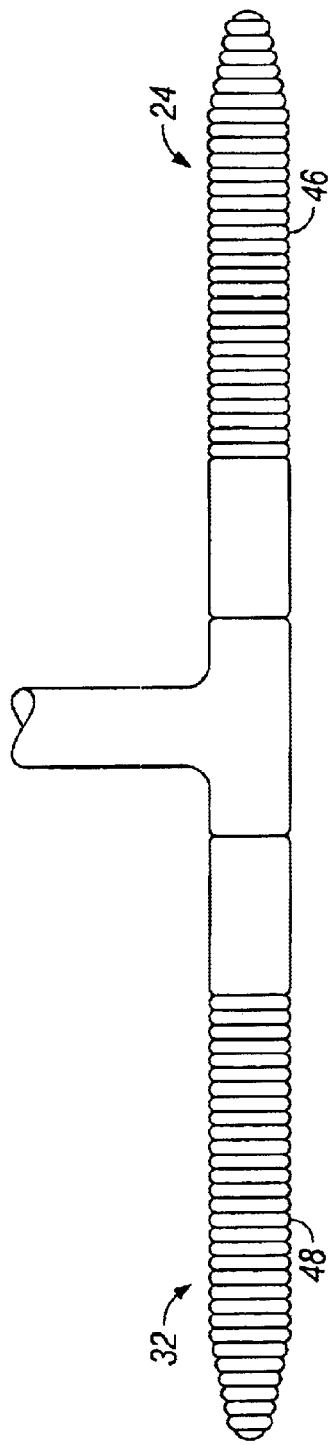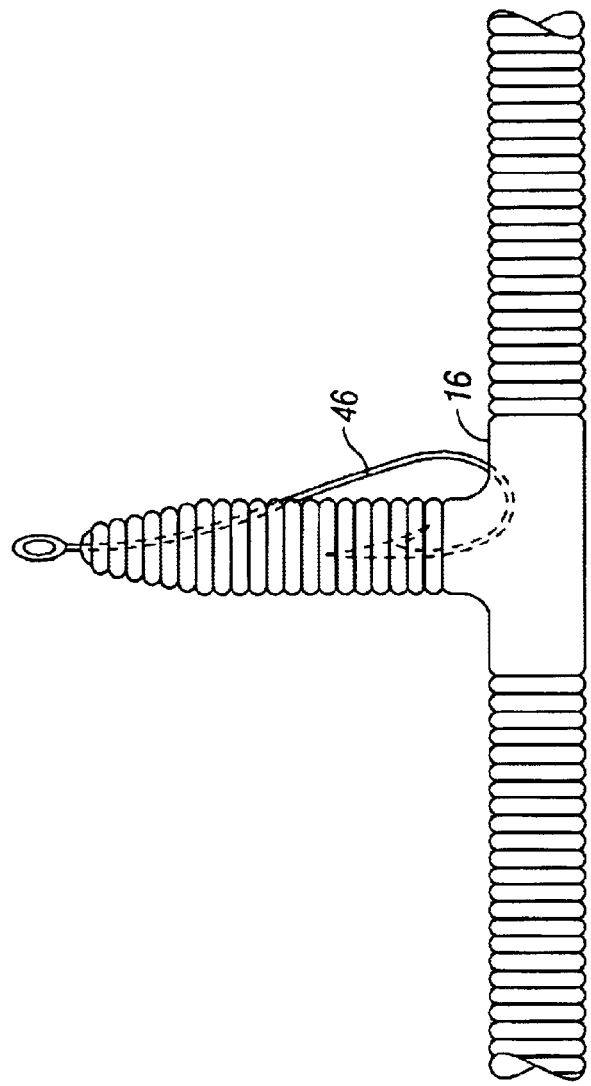
FIG. 5
FIG. 6

METHOD FOR FISHING WITH WEEDLESS EASY-FALL BAIT

FIELD OF THE INVENTION

The present invention relates to a method for fishing using a lure and the wacky style fishing technique.

BACKGROUND OF THE INVENTION

Various fishing methods exist with varying levels of success. Success can depend on whether a lure gets caught in weeds while casting, and success can depend on whether a lure acts like genuine food for a fish.

A need has existed for a method of fishing to have a high strike rate by bass and other fish, which is capable of being used in varying water conditions, including deep water, surface water and cloudy water.

A need has existed for a method of fishing with a fishing lures that typically attempts to mimic live bait actions by having realistic movements, colors and shapes. Many lures depend solely on the movement rather than the visual realisms to attract fish. A need has existed for a method for fishing with a lure, which imitates a worm in appearance, but has the ability to generate vibrations and remain weedless when fished wacky style in all types of heavy cover and have the flexibility to attract fish from a variety of directions.

Prior art lures having water engagement surfaces that will cause the lure to move erratically or vibrate as it is pulled through the water, include U.S. Pat. Nos. 2,523,536; 3,162,971; and 5,167,088. None of these patents, however, address the worm shape.

In U.S. Pat. No. 2,523,536, a fishing lure is disclosed having a main body member with multiple heads extending there from. A large "head" portion is defined by a disk that is pivoted to the main body member. U.S. Pat. No. 3,162,971 shows a sinking artificial lure having a body member with a large front plate portion and wing-like member extending from the rear thereof.

U.S. Pat. No. 5,167,088 is directed to an adjustable fishing lure activator which has a disk shaped activator of sheet plastic installed on the leader just in front of the lure's main body. The activator has a crease extending from a central opening defining an angled area.

Other references with a naturalistic bait-like shape and with water reacting structures include U.S. Pat. No. 2,775,839; 3,585,749; and 5,276,992.

In U.S. Pat. No. 2,775,839, a fishing lure with an up/down motion having a fish-like body with the deflector plates pivotally mounted on its front.

U.S. Pat. No. 3,585,749 is a flexible fishing lure having a multi-chambered hollow body through which water passes as it is pulled through the water. A deflector valve opening varies the water volume so that water passes alternately from one chamber to the other imparting a realistic action to the lure.

U.S. Pat. No. 5,276,992 shows a lure having a hollow head portion through which water passes exiting through the gills thereby imparting motion to the lure by the effective water flow.

A need has long existed for a worm like lure with the combined ability to cause vibration in the water, capable of holding or offering attractant to a fish, that is flexible and able to slide through weeds, timber, rocks, back brush. The present invention has been designed to meet that need.

SUMMARY OF THE INVENTION

The invention is a method of fishing using a flexible fishing lure by attaching a hook to a fishing line, attaching the hook to the flexible fishing lure, and engaging the hook to a solid rod of the fishing lure and through an egg sack connected to the rod. The egg sack has a smooth outer surface and forms an angle between 60 and 90 degrees. The egg sack has two ends and a smooth outer surface. The lure has two legs each with a leg head, a leg tail, and a leg outer surface. The leg heads are connected to the end of the egg sack. The rod and two legs have substantially identical conical shapes with substantially identical outer diameters, and wherein the egg sack has a conical shape with an outer diameter 0.01 to 0.05 mm larger than the outer diameter of the rod and the first and second legs. The method ends by casting the lure through various types of cover, placing the lure in the strike zone causing reaction strikes from the fish without entangling the cover while maintaining a natural presentation to the bait, and bouncing the lure multi-directionally through the cover and creating vibration in the water without entangling the hook and the lure in the cover.

BRIEF DESCRIPTION OF THE DRAWINGS

The present invention is detailed below with reference to the listed Figures.

FIG. 1 is a top view of the lure.

FIG. 2 is a side view of the lure of the invention.

FIG. 3 is a side view of the lure of the invention with 3 egg sacks.

FIG. 4 is a side view of the invention of FIG. 3 with a flat side.

FIG. 5 is a side view of the invention with two flat legs.

FIG. 6 is a detailed view of the invention with a hook in the rod.

DETAILED DESCRIPTION OF THE PREFERRED EMBODIMENTS

Before explaining the present invention in detail, it is to be understood that the invention is not limited to the particular embodiments and that it can be practiced or carried out in various ways.

The invention is related to a method of fishing using a fishing lure with a flexible elongated body portion having a unique design which prevents entanglement in weeds or other cover and which simulates actual bait like movement.

Figure 10A:
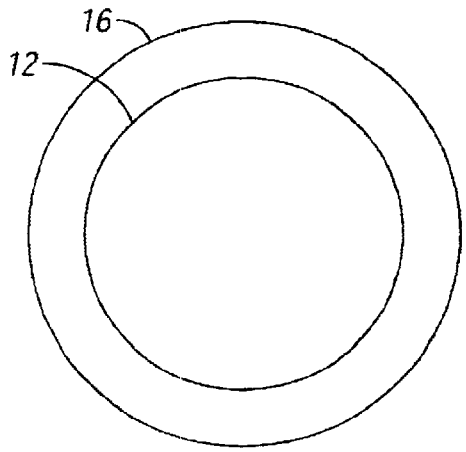
FIG. 10a, FIG. 10b, and FIG. 10c depict a detailed view showing the egg sack having a cylindrical shape with an outer diameter 0.01 to 0.05 mm larger than the outer diameter view of the rod and the first and second legs.
Figure 10B:
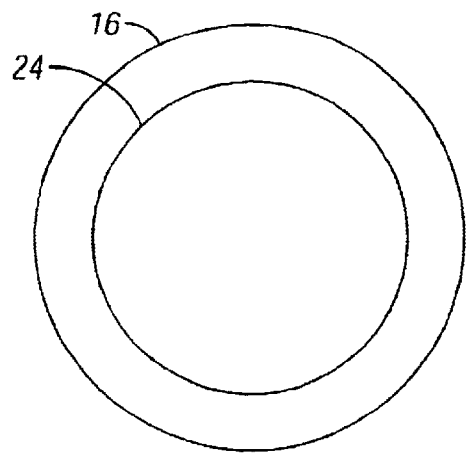
Figure 10C:
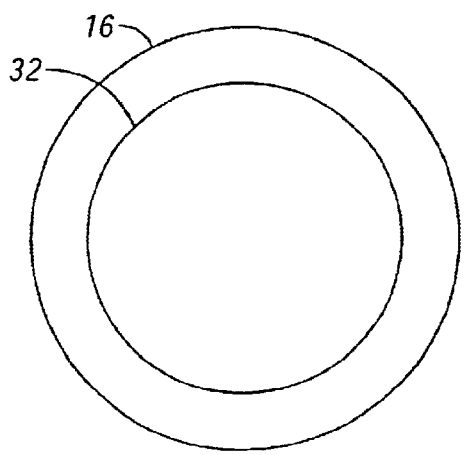

The invention is a method of fishing using a flexible fishing lure. The method involves attaching a hook to a fishing line, attaching the hook to the fishing lure, and engaging the hook to a solid rod of the fishing lure and through an egg sack connected to the rod. The solid rod has an outer surface. The egg sack forms an angle between 60 and 90 degrees. The egg sack has a first end and a second end and a smooth outer surface. The fishing lure itself has first leg with a first leg head, a first leg tail, and a first leg outer surface, wherein the first leg head is connected to the first end of the egg sack. The fishing lure also has a second leg with a second leg head, a second leg tail, and a second leg outer surface connected to the second end of the egg sack. The rod, first and second legs have substantially identical conical shapes with substantially identical outer diameters. The egg sack 16 has a cylindrical shape with outer diameter 0.01 to 0.05 mm larger than the outer diameter of the rod 12 and the first and second legs 24 and 32, as shown in FIG. 10. The method continues by casting the lure through various types of cover and placing the lure in the strike zone causing reaction strikes from the fish without entangling the cover while maintaining a natural presentation to the bait. The method ends by bouncing the lure multi-directionally through the cover and creating vibration in the water without entangling the hook and the lure in the cover.

The invention is a method of fishing using a flexible fishing lure. The method involves attaching a hook to a fishing line, attaching the hook to the flexible fishing lure, and engaging the hook to a solid rod of the fishing lure and through an egg sack connected to the rod. The solid rod has an outer surface. The egg sack forms an angle between 60 and 90 degrees. The egg sack has a first end and a second end and a smooth outer surface, wherein the first leg head is connected to the first end of the egg sack. The fishing lure also has a second leg with a second leg head, a second leg tail, and a second leg outer surface connected to the second end of the egg sack. The rod, first and second legs have substantially identical conical shapes with substantially identical outer diameters. The egg sack 16 has a cylindrical shape with outer diameter 0.01 to 0.05 mm (0.0004 to 0.002 inches) larger than the outer diameter of the rod 12 and the first and second legs 24 and 32, as shown in FIG. 10. The method continues by casting the lure through various types of cover and placing the lure in the strike zone causing reaction strikes from the fish without entangling the cover while maintaining a natural presentation to the bait. The method ends by bouncing the lure multi-directionally through the cover and creating vibration in the water without entangling the hook and the lure in the cover.

Inserting rattles into the legs of the lure can enhance the method of the fishing. The lure itself can be made by mixing pigment and glitter into a resin. The method of fishing can be further enhanced by making a lure with attractant mixed into the resin of the lure. The resin can be a liquid plastic.

In its preferred and illustrated embodiment, as shown in FIGS. 1 and 2, the lure 10 has a rod 12 having an outer surface 14. An egg sack 16 is connected to the 12 rod forming an angle between 60 and 90 degrees angle. The rod is preferably solid, but a hollow embodiment is also contemplated herein.

The egg sack 16 has a first end 18 and a second end 20 and a smooth outer surface 22.

The lure further consists of a first leg 24 comprising a first leg head 26 connected to the first end of egg sack. The first leg 24 also has a first leg tail 28 and a first leg outer surface 30. The lure has a second leg 32 having a second leg head 34 and a second leg tail 36 and a second leg outer surface 38. The second leg head 34 connects to the second end 20 of the egg sack.

The rod, and the first and second legs have substantially identical conical shapes in a preferred embodiment with substantially identical outer diameters in the most preferred embodiment, one preferred outer diameter is contemplated as 0.375". The egg sack 16 also preferably has a cylindrical shape with an outer diameter between 0.01–0.05 mm larger than the outer diameter of the rod and the first and second legs 24 and 32, as shown in FIG. 10. The lack of grooves in the egg sack provide for more strength at the connect point and also provide for the proper bend-point to make lure "wacky style" and initiates the action. If the legs are too close together, then the lure action is less effective for catching fish, this design with separated legs, about 60 degrees from the central axis of the rod, provides an optimum design.

The rod, and the first and second legs have substantially identical conical shapes in a preferred embodiment with substantially identical outer diameters in the most preferred embodiment, one preferred outer diameter is contemplated as 0.375". FIG. 2 depicts the feature that the rod 12, first leg 24, and the second leg 32 have substantially identical conical shapes. The egg sack 16 also preferably has a cylindrical shape with an outer diameter between 0.01–0.05 mm (0.0004–0.002 inches) larger than the outer diameter of the rod and the first and second legs 24 and 32, as shown in FIG. 10. The lack grooves in the egg sack provide for more strength at the connect point and also provide for the proper bend-point to make lure "wacky style" and initiates the action. If the legs are too close together, then the lure action is less effective for catching fish, this design with separated legs, about 60 degrees from the central axis of the rod, provides an optimum design.

FIG. 4 shows it is contemplated that the egg sacks could be flat on one side of the outer surface 33, 17, and 25.

Similarly, FIG. 5 shows that the first and the second leg could each have a flat side 46 and 48 on the outer surface and still create a usable flexible lure.

The rod, first and second legs, and the egg sack are preferably made from a flexible synthetic resin, such as from liquid Plastisol available from numerous manufacturers. The preferred materials are polymers of propylene, ethylene, and various polymer-based resins.

In addition, flecks of sparkle or glitter can be added to the resin to attract fish. Glitter from a craft store is typically used, although synthetic polyester glitter can be used. Gold glitter is a preferred glitter for a red plastic lure.

It is also contemplated that pigments can be added to the resin in at least 90 colors, including red, blue, and beige as a preferred color. Dyes could be used instead of pigments in the liquid plastic. It is also contemplated that the lure be painted with paint, such as Pro-Tec Powder Paint available from Bass Pro Shop of Springfield, Mo. It is also contemplated that other UV stabilizers, fillers and antioxidants can be added to the lure to prevent degradation and reduce costs of manufacture.

The first leg, second leg, and rod in the most preferred embodiment all have an outer diameter that is identical and all three appendages are conical in shape. The most preferred outer diameter is contemplated to be 0.375 inch, as measured form the largest ridge, however, diameters of 0.275 inch ½ inch are considered as usable herein. An outer diameter range between 0.225–0.450 inches are usable.

The egg sack is preferably 1 inch in length with the most preferred length of 1.080 for a 6.25 inch combined leg length. A range of egg sack lengths would range from 0.575–2.5 inches. For a 7.408-combined leg length lure, a preferred egg sack would be 1.125 inches long. The lure has a preferred leg-to-leg overall length of 6 to 8 inches. However, in the longer lures, it is contemplated that longer egg sacks would be used, preferably between 1 inch and 2 inches in length. For the 6.25-inch lure, the egg sack would have an OD of about 1.080 inches. For the 7.4 inch lure, the egg sack would have an OD of about 1.125 inches. For the 10-½ inch lure, the egg sack would have an OD of between 1.15 and 2.5. It is contemplated that the leg-to-leg overall length would be between 4 and 12 inches long.

In a preferred embodiment, the lure has a dimension from the tip of the first leg to the tip of the second leg of 6.25 inches. Lures having a length from the tip of the first leg to the tip of the second leg of 7.408 inches and up to 10½ inches are also contemplated. The $1^{st}$ and $2^{nd}$ leg lengths for the 6.250-inch worm would each are 2.5 inches and the preferred rod length would be 1.375 inches. The tapered tails of the legs would have a 0.125-inch OD.

The $1^{st}$ and $2^{nd}$ leg length for the 7.408-inch worm would each be 3.125 inches with a rod length of 1.625 and a tail OD of 0.164.

In another embodiment, the lure could be grooved with concentric ridges that are separated by approximately 0.01 to 0.005 inches.

It is considered that the lure could be constructed with smooth sides. Finally it is contemplated that the lure could have spiral ridges disposed on each leg and on the rod, however the grooved embodiment provides vibration in the water, which increases the attraction to a fish.

As shown in FIG. 2, which is a side view of the invention, shows that the first leg and the rod are preferably connected at 90-degree angles with a seamless construction.

FIG. 6 shows a detail of the egg sack usable in the invention. Preferably it is smooth and solid with a hook 46 inserted.

Figure 7:
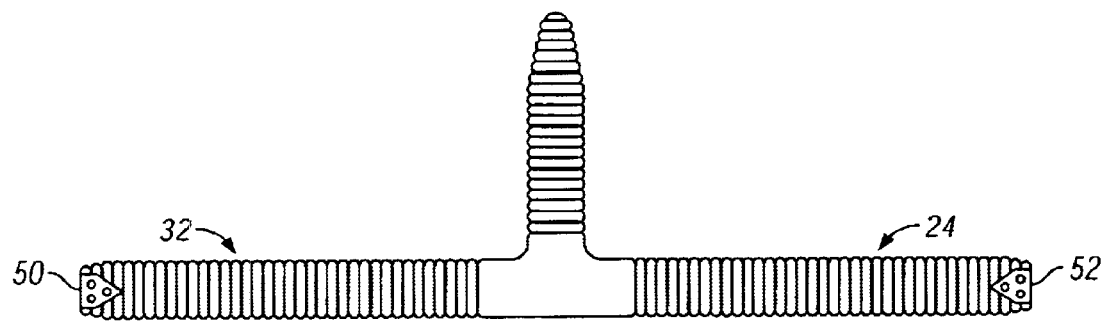
FIG. 7 is a side view of the invention with rattles disposed in the tapered ends.

FIG. 7 show an embodiment when the invention could have rattles 50 and 52 inserted into the lure legs to attract fish (not in the egg sack), the rattles 50 and 52 can range from 3 mm–7 mm (0.0012–0.0028 inches) in size or an attractant could be mixed with the plastic resin. The attractant can be, garlic or salt impregnation.

Figure 8:
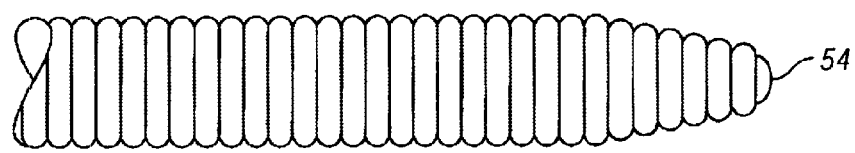
FIG. 8 is a detailed view of a tail of a leg of the invention with the tapered flat end.

FIG. 8 shows in detail that the first leg each tapered from 0.375 to 0.164 inches and then the ends are a flat surface 54.

Figure 9:
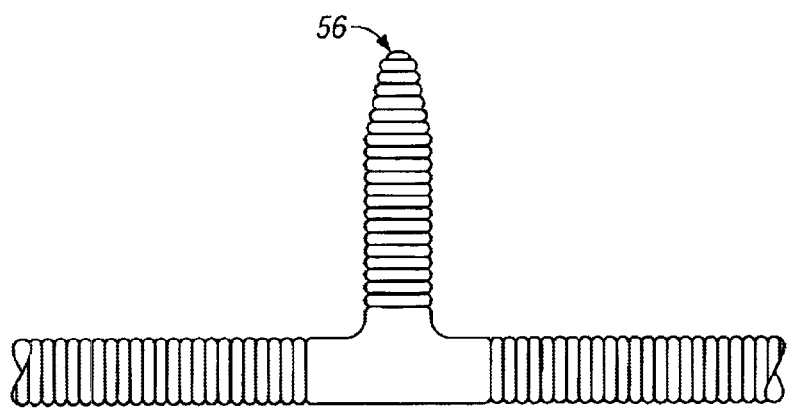
FIG. 9 is a detailed view of the rod of the invention with the rounded top.

FIG. 9 shows in detail that the rod has an end with a rounded top 56, which prevents ripping and tearing of the lure. The rod could also have a tapered end with a flat surface in an alternative embodiment. However, it is possible that the first leg tail and second leg tails can be tapered to a point.

In a preferred embodiment, the lure is conceived having the shape of a "T".

Finally, it is contemplated that and provides the advantageous features and meet the objectives of this invention.

While this invention has been described with emphasis on the preferred embodiments, it should be understood that within the scope of the appended claims, the invention might be practiced other than as specifically described herein.

What is claimed is:

1. A method of fishing, using a flexible fishing lure comprising:
   a. providing a flexible fishing lure consisting of an integrally molded one-piece body comprising: a solid rod, an egg sack connected to the rod, wherein the egg sack has a smooth outer surface and forms an angle between 60 and 90 degrees relative to the rod and wherein said egg sack has a first end and a second end, and wherein said lure comprises a first leg comprising a first leg head, a first leg tail, and a first leg outer surface, wherein the first leg head is connected to the first end of the egg sack and a second leg comprising a second leg head, a second leg tail, and a second leg outer surface, wherein the second leg head is connected to the second end of the egg sack; and wherein the rod, first and second legs have substantially identical conical shapes with substantially identical outer diameters, and wherein the egg sack has a cylindrical shape with an outer diameter 0.01 to 0.05 mm larger than the outer diameter of the rod and the first and second legs;
   b. attaching a hook to the lure and a fishing line;
   c. casting the lure through various types of cover into water with fish;
   d. placing the lure in the strike zone causing reaction strikes from fish without entangling in cover while maintaining a natural presentation to the lure; and
   e. bouncing the lure multi-directionally through the cover and creating vibration in the water without entangling the hook and the lure in the cover.

2. The method of claim 1, wherein said cover is selected from the group:
   buckbrush, timber, vegetation, hydrilla moss, lily pads, and rock ledges.

3. The method of claim 1, wherein the strike zone is between 5 feet and 10 feet around the cover.

4. The method of claim 1, wherein the lure's multi-directional bouncing ability can present the first and second legs at angles ranging from 30 to 90 degrees.

5. The method of claim 1, wherein the lure is soaked in attractant prior to fishing.

6. The method of claim 1, wherein the method of fishing is enhanced by inserting rattles into the legs of the lure.

7. The method of claim 1, wherein the lure is made by mixing pigment and glitter into a resin.

8. The method of claim 7, wherein the method of fishing is enhanced by making a lure with attractant mixed into the resin of the lure.

9. The method of claim 8, wherein the resin is a liquid plastic.

* * * * *